G. R. LONG & H. G. CORDLEY.
LIQUID COOLER.
APPLICATION FILED JAN. 22, 1913.
1,079,918.
Patented Nov. 25, 1913.
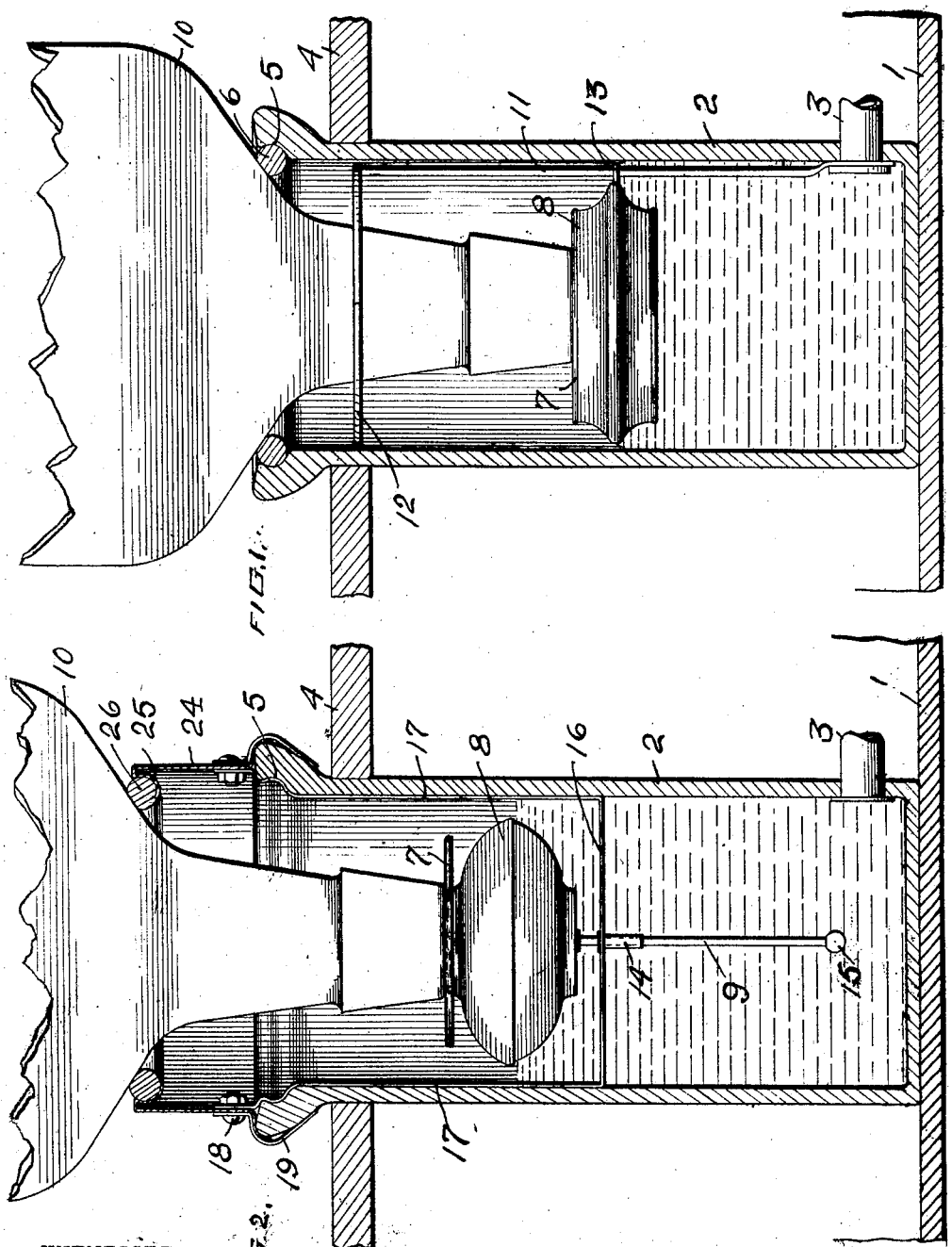
WITNESSES
INVENTORS
George R. Long
Henry G. Cordley
by A. P. Greeley
Attorney

UNITED STATES PATENT OFFICE.

GEORGE R. LONG, OF WATERBURY, CONNECTICUT, AND HENRY G. CORDLEY, OF GLEN RIDGE, NEW JERSEY, ASSIGNORS TO SAID LONG.

LIQUID-COOLER.

1,079,918.

Specification of Letters Patent.  Patented Nov. 25, 1913.

Application filed January 22, 1913. Serial No. 743,686.

*To all whom it may concern:*

Be it known that we, GEORGE ROBERT LONG, a citizen of the United States, residing at Waterbury, in the county of New Haven, State of Connecticut, and HENRY G. CORDLEY, a citizen of the United States, residing at Glen Ridge, county of Essex, State of New Jersey, have invented certain new and useful Improvements in Liquid-Coolers, of which the following is a description, reference being had to the accompanying drawings, forming a part hereof.

The invention relates to coolers for bottled liquids such as spring water, lemonade or other beverages which are adapted to maintain a constant supply of cooled liquid as it is drawn off for use. Such coolers comprise an outer chamber for containing ice, an inner receptacle for the liquid within the ice chamber and a draw-off faucet leading from the liquid receptacle through the wall of the ice chamber.

Various means have been employed to maintain the liquid in the liquid receptacle at a constant level as it is drawn off for use. Among other devices for this purpose an inverted bottle having its mouth extending into the mouth of the liquid receptacle and dip-sealing in the liquid receptacle has been employed and is more or less objectionable in that the liquid in the liquid receptacle washes the mouth of the bottle and absorbs whatever dirt or bacteria may be on it.
It is the object of the present invention to provide an arrangement in which the liquid may be fed to the liquid receptacle from an inverted bottle in such a way as to maintain the liquid in the liquid receptacle at a constant level without having the bottle mouth in the liquid thus avoiding the washing of the bottle neck in the liquid.

With this and other objects hereinafter explained in view the invention consists in the construction and combination of elements hereinafter described and claimed.

Referring to the drawings: Figure 1 is a vertical central sectional view of a cooler embodying our invention in its preferred form and Fig. 2 is a similar view of a modified form.

In the drawings 1 indicates the ice chamber preferably formed of indurated fiber.
2 indicates the liquid receptacle preferably formed of porcelain.

3 indicates a draw-off faucet extending through the wall of the ice chamber by means of which the cooled liquid may be drawn off as wanted. The liquid receptacle preferably rests on the bottom of the ice chamber as shown.

4 indicates the cover of the ice chamber through which the liquid receptacle extends and which fits around the upper end of the liquid receptacle.

The mouth of the liquid receptacle is provided on its interior with an annular groove 5 in which fits, in the form shown in Fig. 1, a rubber gasket 6. Within the inner receptacle 2 is arranged a disk valve 7 movable up and down carried by a float 8. In the form shown in Fig. 1, which is the preferred form, the disk valve 7 forms the top of the float 8. In the form shown in Fig. 2 the disk valve is secured to the top of the float.

In each of the constructions shown means are provided for retaining the float within the inner receptacle 2 and guiding it in its up and down movement as the liquid in the receptacle rises and falls as it is drawn off through the faucet or replenished from the source of supply which is an inverted bottle suitably supported with its neck extending downward into the open mouth of the inner receptacle 2. In the form shown in Fig. 1 the guiding and retaining means consists of a vertical rod 11 secured at its lower end to the inner end of faucet 3 and having its upper end bent to form a circle 12 slightly less in diameter than the interior of the inner receptacle. On this rod travels a ring 13 secured to the float 8. In the form shown in Fig. 2 the float carries a rod 9 which extends downward through a guide tube 14 and has a knob or enlargement 15 at its lower end of such size as not to pass through the guide tube 14. The guide tube 14 is carried by a bar 16 extending across the interior of the inner receptacle and having its end portions 17 bent upwardly to fit against the sides of the jar, the upper portions of these end portions being bent into the groove 5 at the mouth of the inner receptacle. In order to secure the bar 16 against removal, the ends of the portions 17 are secured by bolts 18 to clamps 19 which extend under the lip of the inner receptacle. In Fig. 2 is shown an extension ring 24, the lower end of which rests on the upper end of the inner receptacle 2 and is secured between the upper ends of the portions 17 of the bar 16 and the clamps 19 by the bolts 18. This extension ring is shown as provided at its upper edge with a groove 25 to receive a gasket 26.

The disk 7 in each of the forms shown is intended to be as great or greater in diameter than the outer diameter of the mouth of the bottle so that as the liquid is drawn off and the float drops letting air into the bottle and letting liquid run out, the liquid so escaping will not run directly down into the already cooled liquid in the inner receptacle but will be spread out and will thus be deposited on the previously cooled liquid so that the lower portion of the liquid near the faucet will not be disturbed as much as it would by a stream running directly downward from the mouth of the bottle.

Having thus described the invention what we claim is:

1. In a liquid cooler the combination of an outer vessel adapted to contain ice, an inner vessel adapted to contain liquid to be cooled and open at its upper end, means for drawing off liquid from the inner vessel, an inverted bottle having its mouth extending downwardly into the upper end of the inner vessel, a valve adapted to close the mouth of the bottle and a float arranged to be operated by the liquid in the inner vessel to bring the valve against or away from the mouth of the bottle, a guide for the float locked in the inner vessel and means for permanently securing the float to the guide to lock it against removal.

2. In a liquid cooler the combination of an outer vessel adapted to contain ice, an inner vessel adapted to contain liquid to be cooled and open at its upper end, means for drawing off liquid from the inner vessel, an inverted bottle having its mouth extending downwardly into the upper end of the inner vessel, a disk valve adapted to close the mouth of the bottle and a float arranged to be operated by the liquid in the inner vessel to bring the disk valve against or away from the mouth of the bottle, a guide for the float locked in the inner vessel and means for permanently securing the float to the guide to lock it against removal.

3. In a liquid cooler the combination of an outer vessel adapted to contain ice, an inner vessel adapted to contain liquid to be cooled open at its upper end and provided at its upper end with a seat adapted to receive the shoulder of an inverted bottle, means for drawing off liquid from the inner vessel, an inverted bottle having its mouth extending into the inner vessel a vertically movable float within the inner vessel provided with a disk adapted to close the mouth of the bottle, of greater diameter than that of said bottle mouth, a guide for the float locked in the inner vessel and means for permanently securing the float to the guide to lock it against removal.

This specification signed and witnessed this 6th day of January A. D. 1913.

GEORGE R. LONG.

In the presence of—
PERCY WARNER,
E. A. HYDE.

This specification signed and witnessed this eighth day of January A. D. 1913.

HENRY G. CORDLEY.

In the presence of—
P. A. WHITMORE,
GEORGE B. WILLIAMS.